US009009712B2

(12) United States Patent
Schmit et al.

(10) Patent No.: US 9,009,712 B2
(45) Date of Patent: Apr. 14, 2015

(54) GPU DISTRIBUTED WORK-ITEM QUEUING (75) Inventors: Michael L. Schmit, Cupertino, CA (US); Radhakrishna Giduthuri, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 450 days.

(21) Appl. No.: 13/422,405

(22) Filed: Mar. 16, 2012

(65) Prior Publication Data

US 2013/0247054 A1  Sep. 19, 2013

(51) Int. Cl.
G06F 9/46 (2006.01)
G06F 17/30 (2006.01)
(52) U.S. Cl.
CPC ................................ *G06F 17/30289* (2013.01)
(58) Field of Classification Search
None
See application file for complete search history.

(56) References Cited

U.S. PATENT DOCUMENTS

| 6,434,590 | B1 * | 8/2002 | Blelloch et al. | 718/102 |
|---|---|---|---|---|
| 6,748,593 | B1 * | 6/2004 | Brenner et al. | 718/105 |
| 7,565,651 | B1 * | 7/2009 | Carey | 718/100 |
| 8,370,842 | B2 * | 2/2013 | Bellows et al. | 718/103 |
| 2007/0288721 | A1 * | 12/2007 | Kruger et al. | 711/207 |
| 2008/0250419 | A1 * | 10/2008 | Kasten et al. | 718/104 |
| 2011/0131430 | A1 * | 6/2011 | Krishnamurthy et al. | 713/320 |
| 2012/0019542 | A1 * | 1/2012 | Shah et al. | 345/522 |
| 2012/0229481 | A1 * | 9/2012 | McCrary et al. | 345/522 |
| 2013/0247067 | A1 * | 9/2013 | Schmit et al. | 718/105 |

* cited by examiner

*Primary Examiner* — Kenneth Tang
(74) *Attorney, Agent, or Firm* — Volpe and Koenig, P.C.

(57) ABSTRACT

Methods and systems are provided for graphics processing unit distributed work-item queuing. One or more work-items of a wavefront are queued into a first level queue of a compute unit. When one or more additional work-items exist, a queuing of the additional work-items into a second level queue of the compute unit is performed. The queuing of the work-items into the first and second level queue is performed based on an assignment technique.

16 Claims, 8 Drawing Sheets

GPU DISTRIBUTED WORK-ITEM QUEUING

CROSS REFERENCE TO RELATED APPLICATIONS

This application is related to U.S. patent application Ser. No. 13/422,430, filed Mar. 16, 2012, which is incorporated by reference herein in its entirety.

BACKGROUND

1. Field of the Invention

The present invention generally relates to processing data using single instruction multiple data (SIMD) cores.

2. Background Art

In many applications, such as graphics processing in a Graphics Processing Unit ("GPU"), a sequence of work-items, which can also be referred to as threads, are processed in order to output a final result. In many modern parallel processors, for example, processors within a SIMD core synchronously execute a set of working items. Typically, the synchronous executing of work-items are identical (i.e., have the identical code base). A plurality of identical synchronous work-items that are processed by separate processors are known as, or called, a wavefront or warp.

During processing, one or more SIMD cores concurrently execute multiple wavefronts. Execution of the wavefront terminates when all work-items within the wavefront complete processing. Each wavefront includes multiple work-items that are processed in parallel, using the same set of instructions. Generally, the time required for each work-item to complete processing depends on a criterion determined by data within the work-item. As such, the work-items with the wavefront can complete processing at different times. When the processing of all work-items has been completed, the SIMD core finishes processing the wavefront.

However, since different work-items require different amounts of processing to complete a required task, a parallel processing compute unit can start processing a particular task effectively utilizing all of the processors, but after a certain number of cycles processor efficiency decreases as some of the work-items are completed. This decrease in efficiency is due to the fact that each block of data is an individual work-item, but all of the individual work-items are scheduled and processed as a single workgroup.

The severity of the decrease in efficiency is dependent upon the type of application being processed by the parallel processors. For example, a facial recognition algorithm may attempt to determine if an area in an image is a face by processing different spatial areas of an image in parallel. Once the algorithm determines that the analyzed area is not a face, the work-item for that spatial area terminates and has no additional work to perform on any subsequent processing cycles. Such facial recognition algorithms may consist of dozens of analysis passes on an identified area to determine if that area of the image includes a face. After as few as four or five passes there may only be a small portion of work-items that remain as possible candidate faces as the remaining images have been determined to either be a face or not a face. However, as there are still some remaining portions of the image that have not been determined whether or not they contain a facial image, the process continues, even though only a small portion of the processors are actually performing any valid processing.

SUMMARY OF EMBODIMENTS

What is needed, therefore, is an improved system and method to schedule work-items in a parallel processing compute unit where the work-items require a variable amount of processing per work-item.

Embodiments of the present invention provide efficient GPU compute optimization utilizing distributed work-item queuing for enhancing overall system operational speed.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Embodiments of the disclosed invention provide an APD, a computer program product, and a method including the queuing of one or more work-items of a wavefront into a first level queue of a compute unit and then performing, if there are additional work-items to be processed, a queuing of the additional work-items into a second level queue. The queuing of the first and second level queues is performed based on an assignment technique. In additional embodiments, the assignment technique may include a random, or pseudo-random method of assignment, a staggered method of assignment, a variable stepping pattern method of assignment, or an assignment based on a feedback based on first or second level queues.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
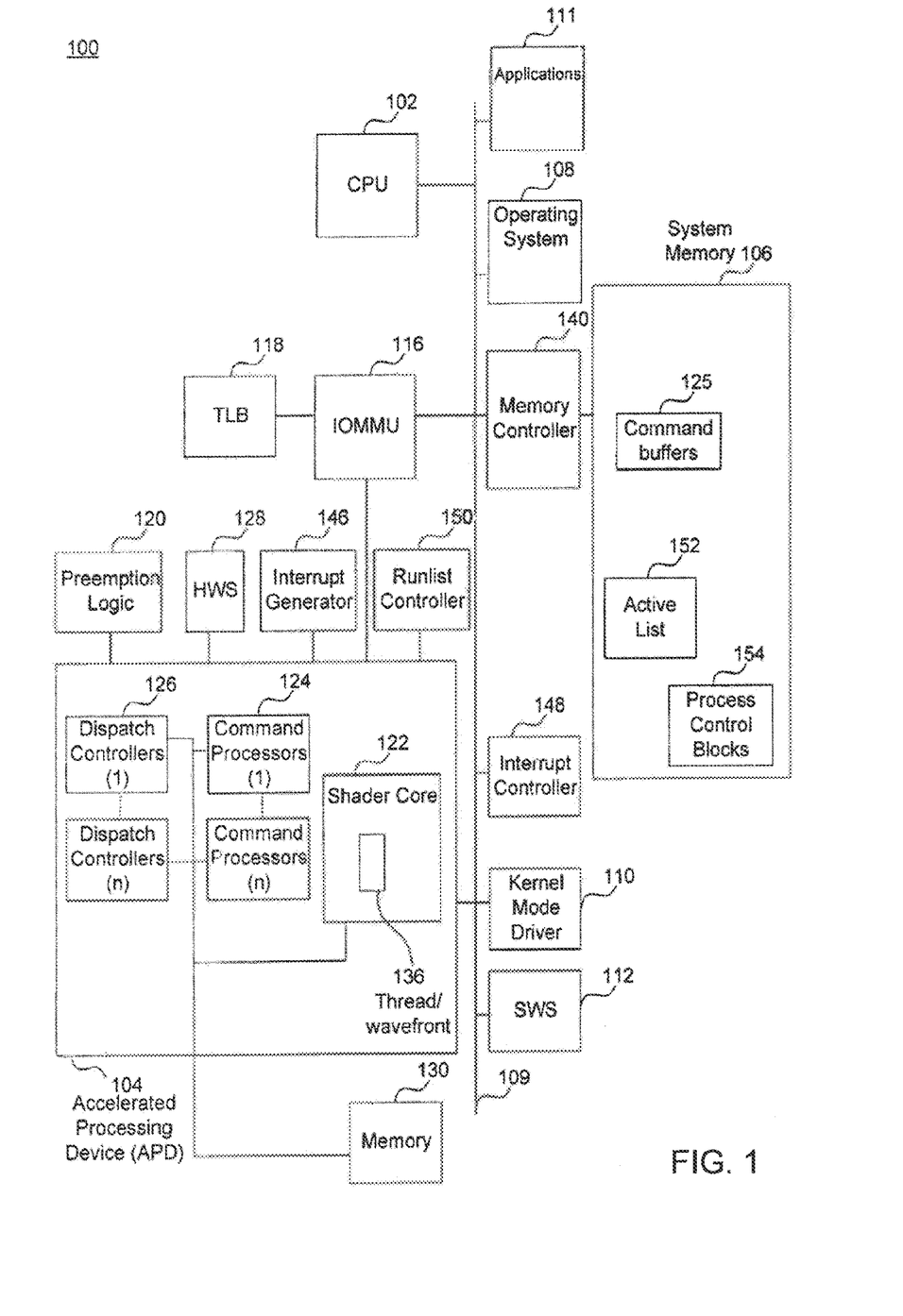
FIG. 1 is an illustrative block diagram of a processing system in accordance with embodiments of the present disclosure.

FIG. 1 is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system. 100 may include one or more software, hardware, and firmware components in addition to, or different from, that shown in the embodiment shown in FIG. 1.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such as a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a workgroup executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and workgroup barriers.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104, also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of workgroups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands and system software can reside in memory 106. Control logic commands fundamental to operating system 108 will generally reside in memory 106 during execution. Other software commands, including, for example, KMD 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application Program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example; shader core 122 can simultaneously execute a predetermined number of wavefronts 136, each wavefront 136 comprising a multiple work-items.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1. For example, computing system 100 can include one or more input interfaces, non-volatile storage, one or more output interfaces, network interfaces, and one or more displays or display interfaces.

Figure 2:
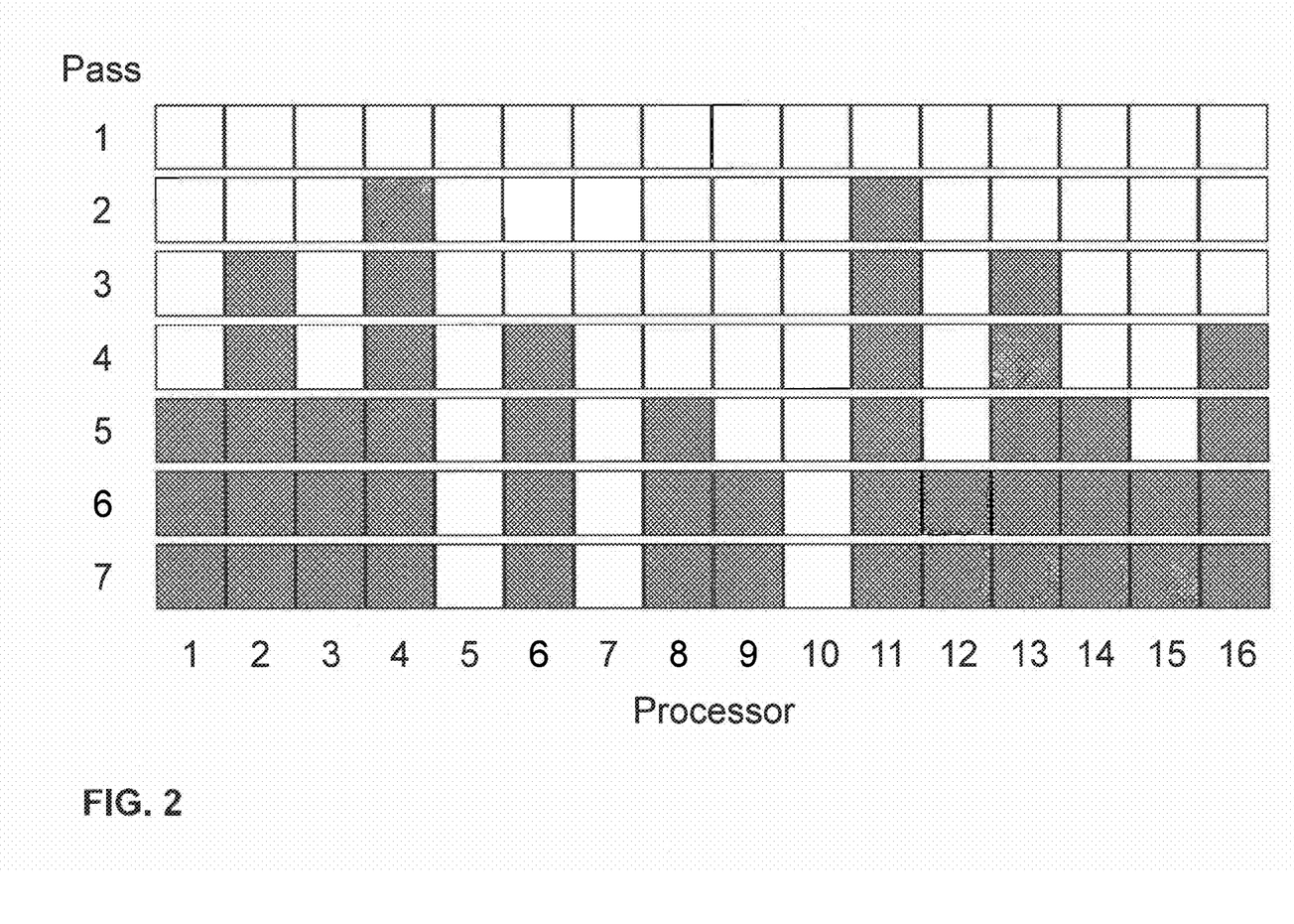
FIG. 2 is an example work load diagram, by work pass, of a set of parallel processors in a compute unit.

FIG. 2 is a chart illustrating a hypothetical processing of work-items, such as a thread/wavefront 136 (FIG. 1), by multiple processors within shader core 122 (FIG. 1). Each box represents a single processor, e.g., a shader in an APD, which operates in parallel with the other processors. However, each box can also be thought of as a single work-item or an entire wavefront's work-items for a set of shader processors.

FIG. 2 illustrates inefficiencies that can occur due to varying processing times required by different work-items. As an example shown in FIG. 2, all sixteen of the processors are initially loaded with a work-item and in the first pass all of the processors are processing valid data and generating a corresponding output. However, in this example, during the first pass of processing processors 4 and 11 complete their processing task. The completion of the work-item is illustrated by the shading in the associated block. As the second pass of processing starts, processors 4 and 11 are no longer processing a work-item as their work-item is complete. Therefore, during the second pass only 14 of the 16 processors are effectively processing work-items. At the end of the second pass, processors 2 and 13 complete the processing of their work-items. Therefore, during the third pass of processing, the compute power of the 16 processors is further reduced, down to an effective throughput of only 12 processors. This process continues through 7 passes where there are only 3 processors left processing valid work-items, while 13 processors are effectively idle.

Figure 3:
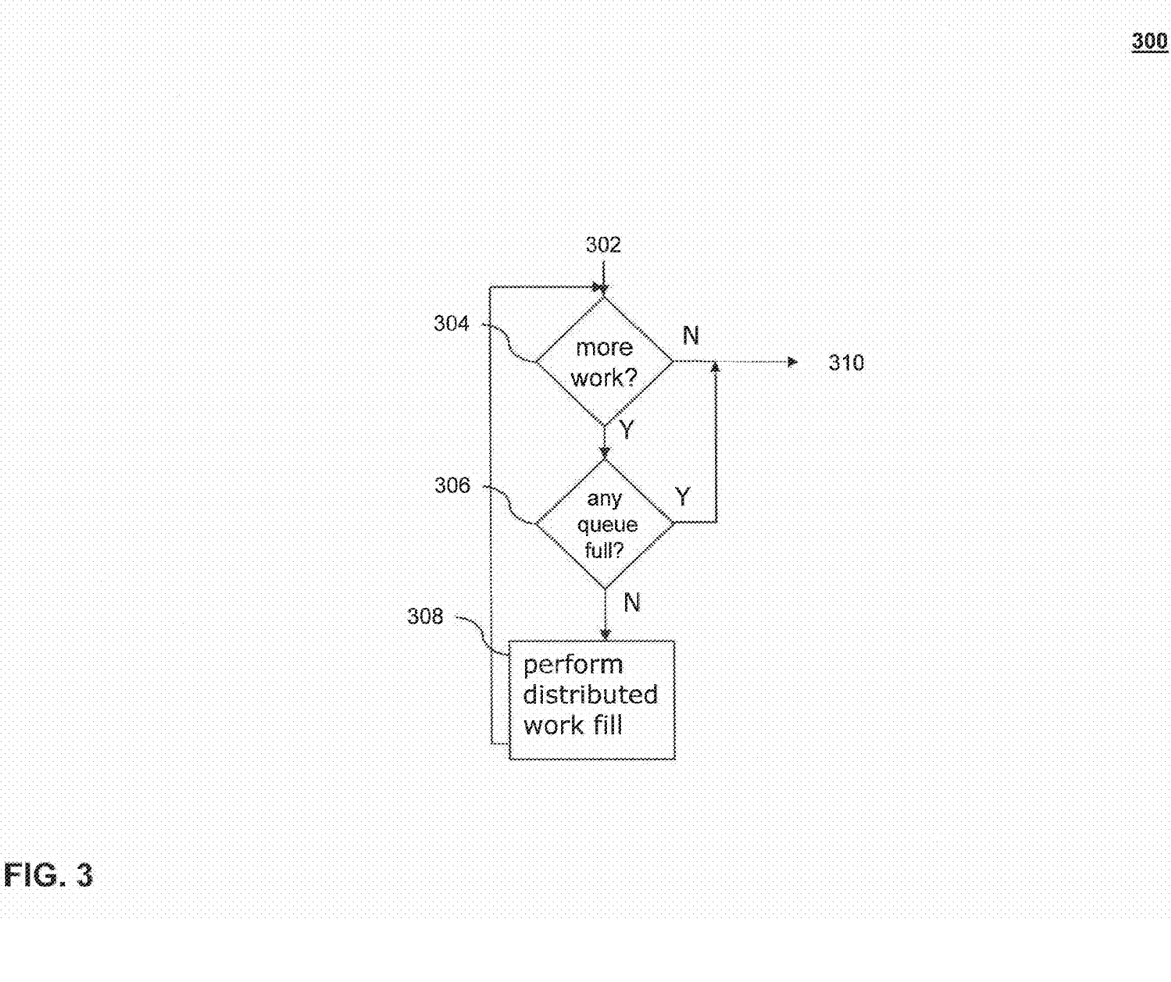
FIG. 3 is a work flow diagram for performing a distributed work fill, according to an embodiment of the present disclosure.

FIG. 3 illustrates a system flowchart 300 representing the assignment of work-items to queues, according to an embodiment. The flowchart starts at step 302 and goes to step 304 where a determination is made if any work-items exist that need to be assigned to a processor. If there are additional work-items to be assigned, the flowchart proceeds to step 306 where a determination is made if any queue associated with any of the processors is full, which will be explained in detail shortly. If none of the queues are full then the flowchart proceeds to step 308 where work-items are distributed to the processors. The process then repeats at step 302 and ends when either there are no more work-items to distribute or when any of the queues are full.

Figure 4:
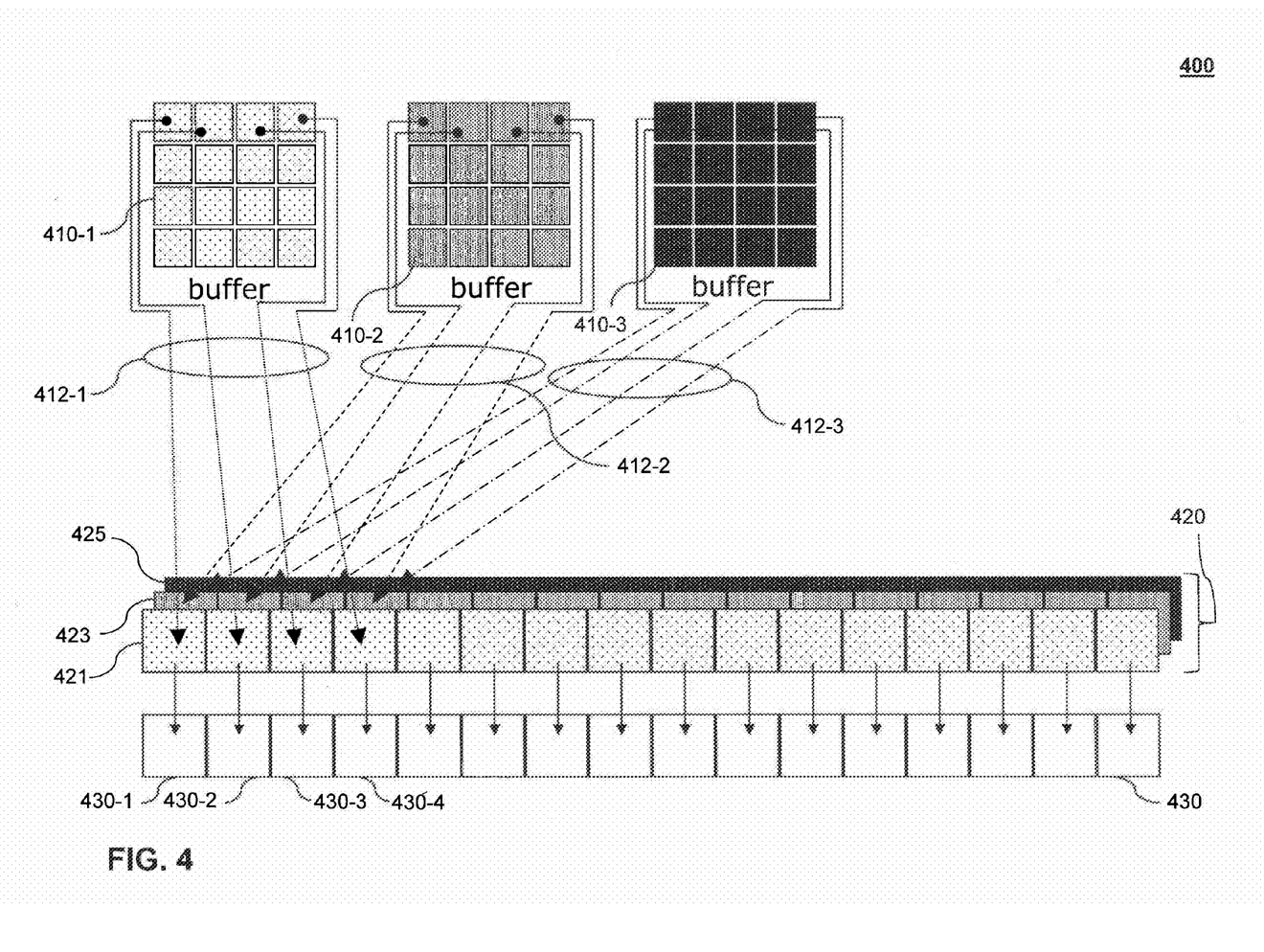
FIG. 4 is an example work fill of multiple level queues, according to an embodiment of the present disclosure.

FIG. 4 is an illustration of a work-item load system 400, according to an embodiment. System 400 includes input buffers 410-1, 410-2 and 410-3, work-items 412, N-depth queues 420, and shader processors 430. Three input buffers 410 are shown as an example, but are not meant to infer any type of restriction as any size and number of buffers can be used. For ease of illustration, works items 412 from the various buffers 410 are shown with different shading. It is to be appreciated that does not mean the different buffers hold different types of work items, rather any combination of types of work items can be in any buffer.

Input buffers 410 each contain a single job consisting of multiple workgroups where one workgroup consists of multiple work-items that run as a wavefront on a compute engine, e.g., a single SIMD. The path of only the first four work-items 412 are illustrated for simplicity, but the path applies to all work-items and shader processors 430.

N-depth queues 420 can contain any number of queues, but are illustrated in this example as consisting of three levels of queues, 421, 423 and 425, each level containing a set of sixteen queues, but may contain as few or as many levels and number of queues as desired. N-depth queues 420 may be actual hardware based registers, or may be virtual queues only containing pointers to the work-items being processed. The process of distributing work-items from buffer 410 to shader processors 430 starts by assigning work-items 412-1 from buffer 410-1 to the top most queue, in this illustration queue 421. As can be seen in FIG. 4, work-items 412-1 are assigned to the first four positions in queue 421 where they will be processed by shader processors 430-1, 430-2, 430-3 and 430-4.

Work load system 400 continues to fill the remaining queues, in this example, queue 423 and queue 425. Queue 423 contains pointers to work-items 412-2 in buffer 410-2. And, in a similar manner queue 425 contains pointers to work-items 412-3 in buffer 410-3. Shader processors 430 will process work-items 412-1 from queue 421 in a first pass. After the first pass is complete the processed work-items are output to an output register or buffer (not shown). In addition, the contents/pointers of queue 421 are replaced by the contents/pointers of queue 423, and the remainder of the queues are similarly incremented.

Work pass 2 proceeds by processing the work-items, now work-items 412-2 in shader processors 430-1, 430-2, 430-3 and 430-4. The process continues until all work-items in buffers 410 have been processed.

N-depth queues 420 and work-items 412 also contain structure for control purposes. For example, queue control data structure could contain items such as a pointer to the queue head, a pointer to the queue tail, a queue entry count, and optional operational statistics. Control data structure could contain items such as a pointer to an actual work-item, a pointer to a destination address, an iteration count, e.g., 0 if ready to run; 1-n count of iterations complete status word; 0 ready to run, first time; 1 ready to run again; and −1 is completed.

FIG. 4 illustrated an embodiment of indirect scheduling of work-items. However, there is the possibility that in some cases the indirect scheduling method will result in a worst case scenario where the same work-item number in each buffer takes the maximum number of passes resulting in processor inefficiencies as previously described. In these cases, this issue is further compounded where work-items that require minimal processing are processed in the same queue as a work-item that requires the maximum number of passes.

For example, in some cases using work-item load system 400 shown in FIG. 4, the first four work-items 412 of buffer 410 are processed by shader processors 430-1, 430-2, 430-3 and 430-4. If those work-items represented a graphics image containing a portion of the image rarely changes, then those work-items will require minimal processing and will always complete very quickly.

However, if work-items that require minimal processing can be combined with work-items in the same N-level queue that require more extensive processing, then the overall efficiency of the compute unit will increase. The concept of distributed work-item scheduling is directed at overcoming these issues found with the indirect scheduling of work-items.

Figure 5:
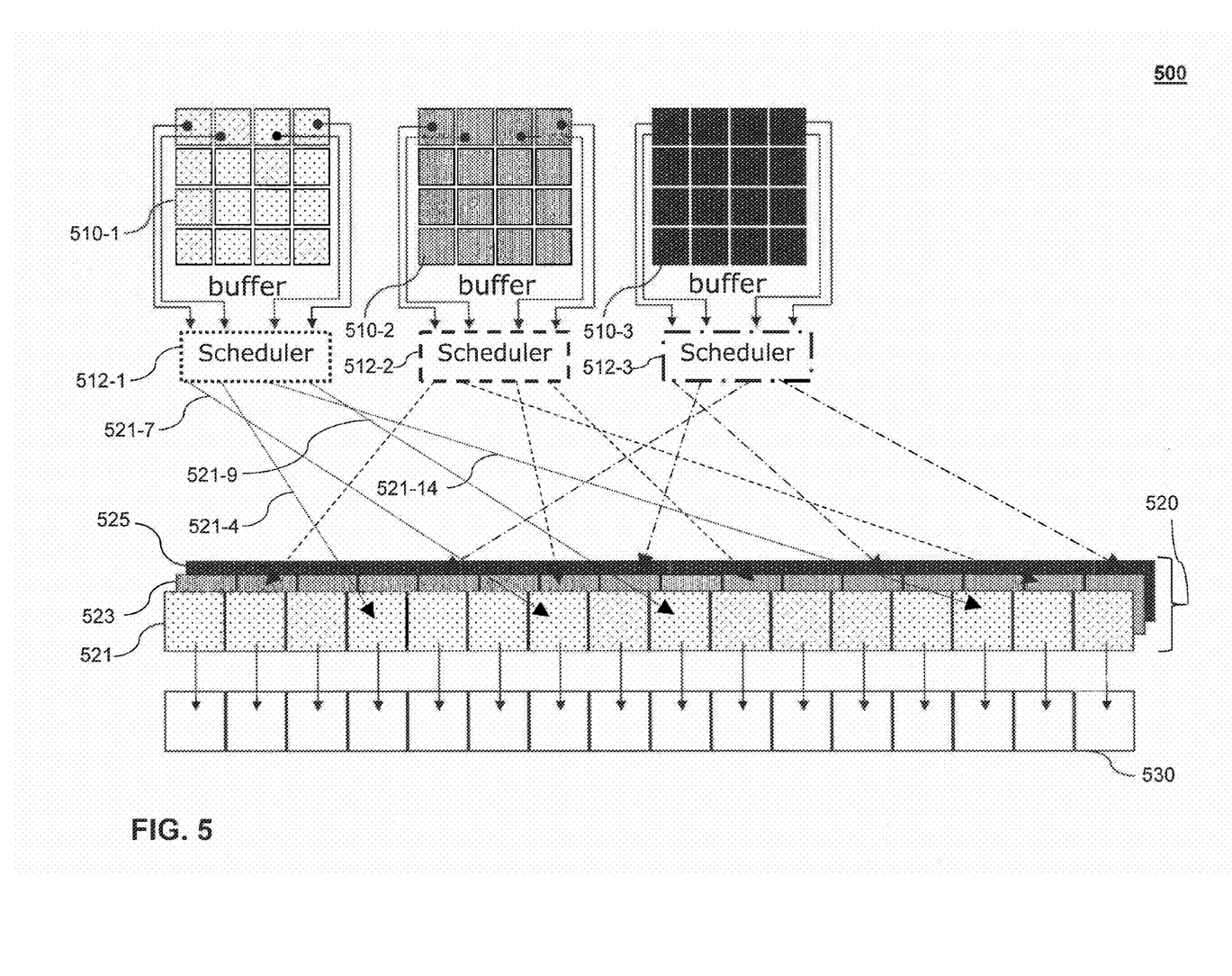
FIG. 5 is an example of random distribution of work-items during queuing, according to an embodiment of the present disclosure.

FIG. 5 is an illustration of a distributed work-item load system 500, according to an embodiment. System 500 includes input buffers 510-1, 510-2 and 510-3, schedulers 512-1, 512-2 and 512-3, n-depth queues 520, and shader processors 530. For example, these components can be similar to and function similar to similar components shown in FIG. 4, with the exception discussed below.

Input buffers 510 each contain a single job consisting of multiple workgroups, where one workgroup consists of multiple work-items that run as a wavefront on a compute engine, e.g., a single SIMD. Again, the paths of only the first four workgroups 521 are illustrated for simplicity, but apply to all work-items and shader processors 530.

N-depth queues 520 can contain any number of queues with any types of work items, but are illustrated in this example as consisting of three levels of queues, 521, 523 and 525, each level containing a set of sixteen queues, but may contain as few or as many levels and number of queues as desired. N-depth queues 520 may be actual hardware based registers, or may be virtual queues only containing pointers to the actual work-items being processed. In the same manner as the indirect scheduling of work-items in work-item load system 400, the process of distributing work-items from a buffer to shader processors 530 starts by assigning work-items from buffer 510-1 to the top most queue, queue 521. However, scheduler 512-1 distributes work-items from buffer 510-1 to queue 521, and hence, shader processors 530, according to a pre-defined algorithm. System 500 illustrates a random, or pseudo random, distribution algorithm, where only the first four work-items are shown for clarity.

In this example the first work-item in buffer 510-1 is allocated to the seventh location in queue 521 to be processed by the seventh processor of shader processors 530. The associated work-item allocation is labeled as 521-7. The remaining work-items in buffer 510-1 would also be randomly assigned to locations in queue 521. In this example, the second work-item is directed to queue position 4, labeled 521-4, the third work-item is directed to queue position 14 and labeled 521-14, and the fourth work-item is directed to queue position 9 and labeled as 521-9.

The same random assignment is illustrated with work-items in buffers 510-2 and 510-3 and directed by schedulers 512-2 and 512-3, to queues 523 and 525, respectively. In such an embodiment, if the first work-items of buffers 510-1, 510-2, and 510-3 required minimal processor processing time, as discussed in a previous example, the work-item load system 400 shown in FIG. 4 would result in the first processor of shader processor 530 continually completing before the other processors and hence lower the processing efficiency of shader processors 530. In distributed work-item load system 500 the first work-item of buffer 510-1 was assigned to queue position seven. Rather than being followed by another minimal processing work-item of buffer 510-2, queue position seven of queue 523 contains the third work-item of buffer 510-2, which for this example, in not a minimal processing time work-item. Therefore, the distributed work-item load system 500 will be more efficient than the non-distributed approach of work-item load system 400.

Figure 6:
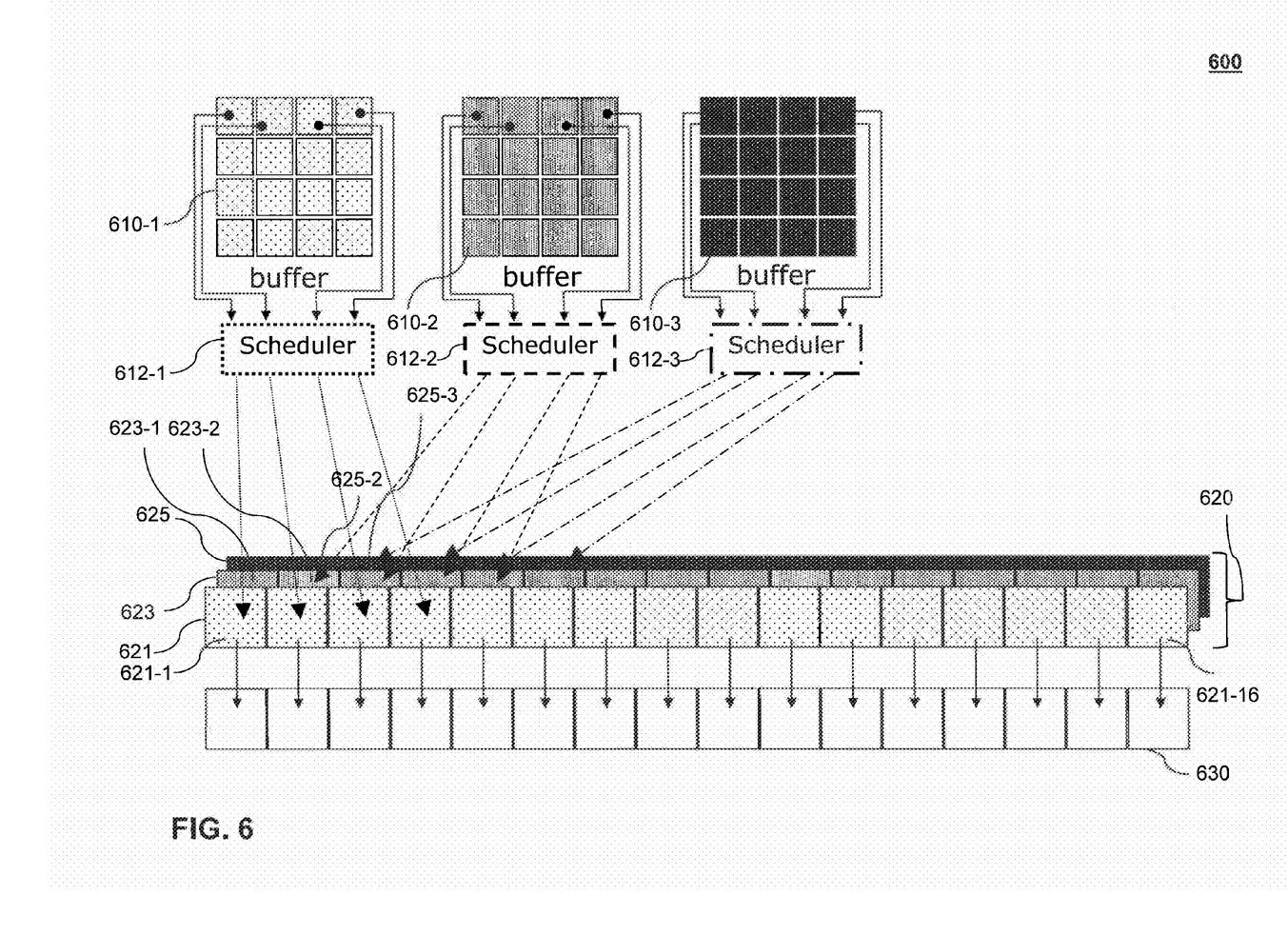
FIG. 6 is an example of staggered distribution of work-items during queuing, according to an embodiment of the present disclosure.

FIG. 6 is an illustration of a distributed work-item load system 600, according to an embodiment. System 600 includes input buffers 610-1, 610-2 and 610-3, schedulers 612-1, 612-2 and 612-3, n-depth queues 620 (here shown containing queues 621, 623 and 625) and shader processors 630. Again, the functionality and characteristics of these items may, in one example, be similar to systems 400 and 500.

The process of distributing work-items from buffers 610 to shader processors 630 starts by assigning work-items from buffer 610-1 to the top most queue, queue 621. Scheduler 612-1 distributes work-items in buffer 610-1 across shader processors 630 according to a pre-defined algorithm. System 600 illustrates a staggered distribution, again, where only the first four work-items are shown for clarity.

In this example the first work-item in buffer 610-1 is allocated to first location 621-1 in queue 621 to be processed by the first processor of shader processors 630. The remaining work-items in buffer 610-1 would be sequentially allocated across the remaining positions in queue 621. Thus, the first work-item of buffer 610-1 is allocated to queue 621 at position 621-1, and the last work-item would be allocated to queue 621 at position 621-16. Buffer 610-2, directed by scheduler 612-2, would allocate its first work-item staggered down by a set number of queue positions. For simplicity, this example shows a staggered amount of a single queue position. Therefore, the first work-item of buffer 610-2 would be allocated to queue 623 at position 623-2. Scheduler 612-2 would then allocate the remaining work-items sequentially across queue 623, with the last work-item, in this example, being allocated to queue 623 and position 623-1, having wrapped around the end of queue 623. In a similar manner, the first work-item of buffer 610-3 would be directed by schedule 612-3 to queue 625 at position 625-3 with the last work-item allocated to queue 625 at position 625-2.

Other staggered balancing algorithms may also be used. For example, instead of offsetting by a single position between queues, the offset could be any constant number of positions. In addition, a variable staggering pattern could be used. For example the change in queue positions between the first and second level queue could be 1, with the change in queue positions between the second a third level queues could be 3, e.g., a variable pattern of 1, 3, 5, 7, etc. As would be known to one of ordinary skill in the art, any pattern of offsets could be used.

Figure 7:
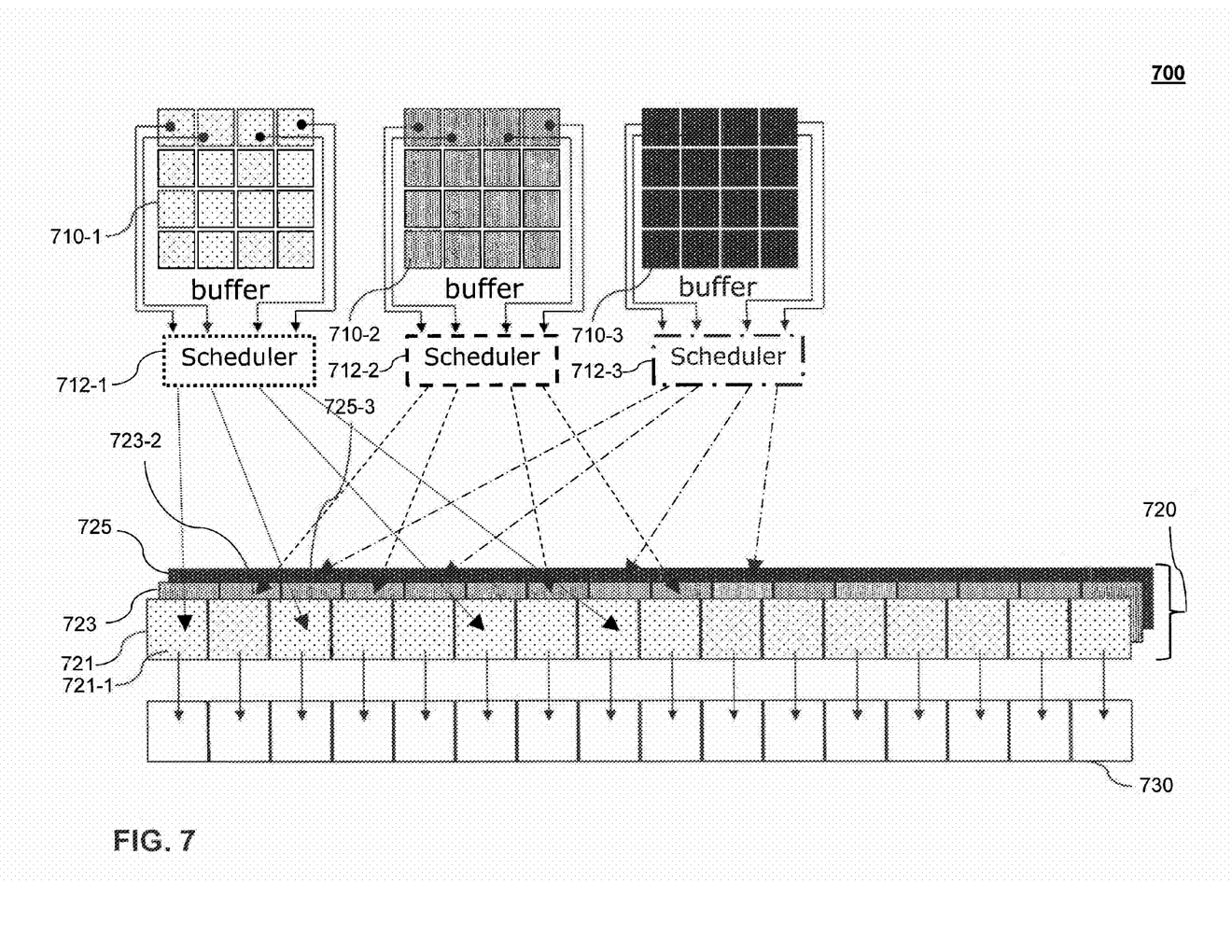
FIG. 7 is an example of staggered and pattern distribution of work-items during queuing, according to an embodiment of the present disclosure.

FIG. 7 is an illustration of a distributed work-item load system 700, according to an embodiment. System 700 includes input buffers 710-1, 710-2 and 710-3, schedulers 712-1, 712-2 and 712-3, n-depth queues 720 (here shown containing queues 721, 723 and 725) and shader processors 730. Again, the functionality and characteristics of these items may, in one example, be similar to systems 400, 500, or 600.

The process of distributing work-items from buffers 710 to shader processors 730 starts by assigning work-items from buffer 710-1 to the top most queue, queue 721. However, scheduler 712-1 distributes work-items in buffer 710-1 across shader processors 730 according to a pre-defined algorithm. System 700 illustrates a staggered and patterned distribution, again, where only the first four work-items are shown for clarity.

In this example the first work-item in buffer 710-1 is allocated to first location 721-1 in queue 721 to be processed by the first processor of shader processors 730. The remaining work-items in buffer 710-1 would be allocated across the remaining positions in queue 721 according to some type of pattern where all of the queue positions are filled. The example here shows a pattern of skipping one queue position and then skipping two queue positions. However, any patterning scheme can be used as long as all of the work-items are allocated into the queue.

Work-items in buffers 710-2 and 710-3 would be allocated by schedulers 712-2 and 712-3, respectively where the starting point for populating the queue is indexed one position from the previous queue.

Other distribution algorithms can be used within a distributed work-item scheduling system. Such an algorithm can include a feedback, or real time feedback system that bases distribution on a status of a queue. Feedback in terms of queue status can originate from any queue, or an level of the N-level queues. For example, if a particular queue is completing work-items sooner than other queues, then the associated N-level queues would be assigned additional work-items for processing. In addition, any combination of the above described algorithms could also be used as a basis for the distribution of work-items.

Methods in accordance with embodiments will be described with respect to the work-item load system and methodologies described in FIGS. 1-7. It is to be appreciated that in each of the embodiments of methods discussed below, the steps may be performed in a different order than described and any of the steps may be optional to the operation, as would be understood by a skilled artisan. Each method is merely an example.

Figure 8:
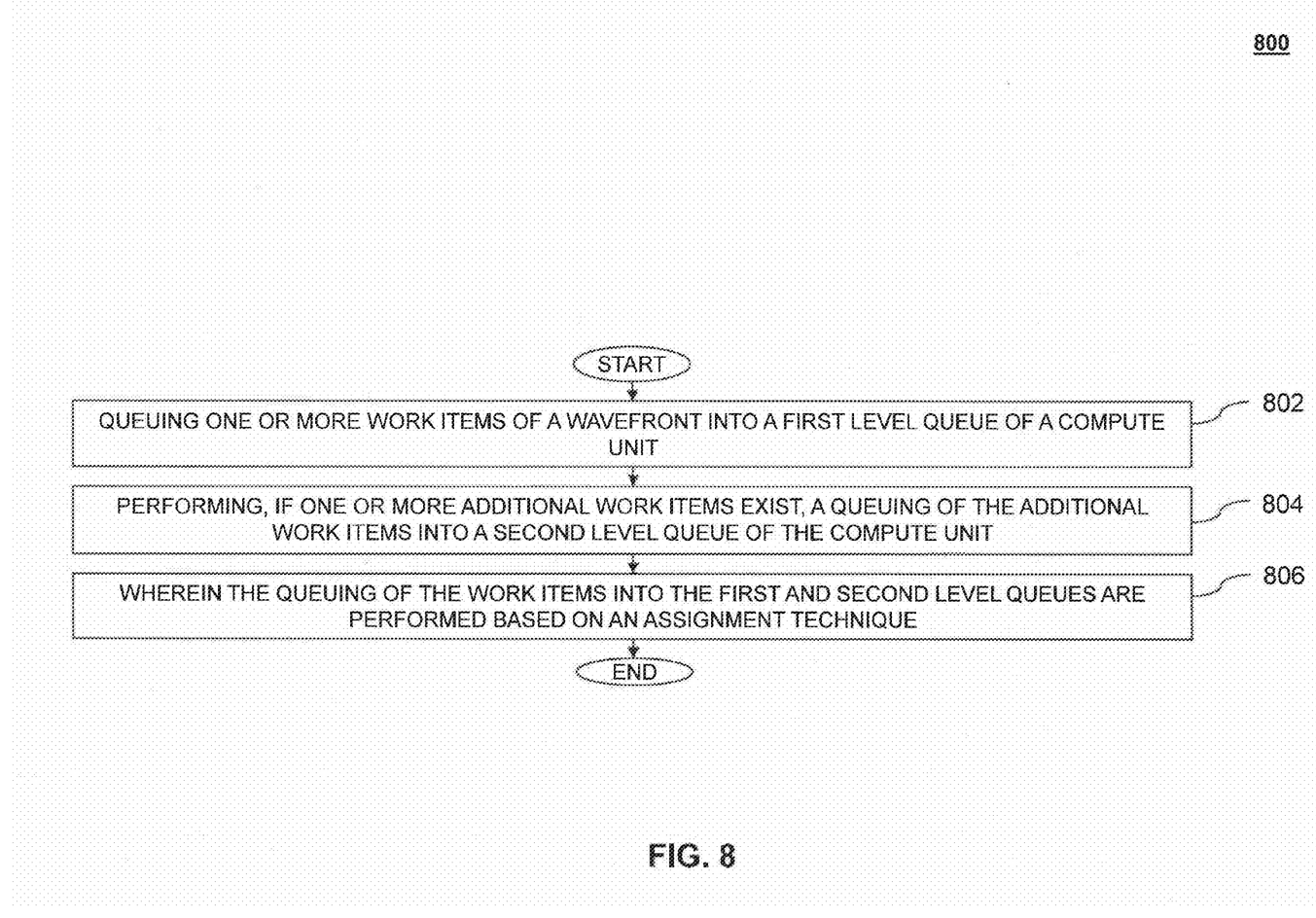
FIG. 8 is an illustrative flow diagram illustration of a method of wavefront optimization in an accelerated processing device, according to an embodiment of the present disclosure.

FIG. 8 is a flowchart of an exemplary method 800 for allocation of work-items in a waveform according to an embodiment of the present invention. For ease of explanation, method 800 is described with respect to work-item load system 400 of FIG. 4 using the systems and methodologies described in FIGS. 1-3 and 5-7, but embodiments of the method are not limited thereto.

Method 800 starts with step 802 that includes queuing one or more work-items of a wavefront into a first level queue of a compute unit. In an embodiment, as shown in FIG. 4, input buffers 410 each contain a single job consisting of multiple workgroups where one workgroup consists of multiple work-items that run as a wavefront on a compute engine, e.g., a single SIMD. N-depth queues 420 can contain any number of queues but are illustrated in this example as consisting of three levels of queues, 421, 423 and 425, each level containing a set of sixteen queues, but may contain as few or as many levels and number of queues as desired. N-depth queues 420 may be actual hardware based registers, or may be virtual queues only containing pointers to the actual work-items being processed. The process of distributing work-items from a buffer to shader processors 430 starts by assigning work-items 412-1 from buffer 410-1 to the top most queue, queue 421. As can be seen in FIG. 4, work-items 412-1 are assigned to the first four positions in queue 421 where they will be processed by shader processors 430-1, 430-2, 430-3 and 430-4.

Method 800 continues to step 804 by performing, if one or more additional work-items exist, a queuing of the additional work-items into a second level queue of the compute unit. In an embodiment, work load system 400 continues to fill the remaining queues, in this example, queue 423 and queue 425. Queue 423 contains pointers to work-items 412-2 in buffer 410-2. And, in a similar manner queue 425 contains pointers to work-items 412-3 in buffer 410-3. Shader processors 430 will process work-items 412-1 from queue 421 in a first pass. After the first pass is complete the processed work-items are output to an output register or buffer (not shown).

Method 800 continues to step 806 wherein the queuing of the work-items into the first and second level queues are performed based on an assignment technique. In an embodiment, as described in FIG. 5, scheduler 512-1 distributes work-items in buffer 510-1 to queue 521, and hence, shader processors 530, according to a pre-defined algorithm. System 500 illustrates a random, or pseudo random, distribution, where only the first four work-items are shown for clarity.

In this example in FIG. 5, the first work-item in buffer 510-1 is allocated to the seventh location in queue 521 to be processed by the seventh processor of shader processors 530. The associated work-item allocation is labeled as 521-7. The remaining work-items in buffer 510-1 would also be randomly assigned to locations in queue 521. In this example, the second work-item is directed to queue position four, labeled 521-4, the third work-item is directed to queue position 14 and labeled 521-14, and the fourth work-item is directed to queue position 9 and labeled as 521-9. The same random assignment is illustrated with work-items in buffers 510-2 and 510-3 and directed by schedulers 512-2 and 512-3, to queues 523 and 525, respectively. Method 800 then ends.

The Summary and Abstract sections may set forth one or more but not all exemplary embodiments of the present invention as contemplated by the inventor(s), and thus, are not intended to limit the present invention and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of wavefront optimization in an accelerated processing device, the method comprising:
    queuing one or more work-items of a wavefront into a first level queue of a compute unit; and
    when one or more additional work-items exist, queuing the additional work-items into a second level queue of the compute unit;
    wherein the work-items and the additional work-items are queued into positions within the first and second level queues in a predetermined variable stepping pattern.

2. The method of claim 1, further comprising processing contents of the first level queue using a plurality of processors in the compute unit.

3. The method of claim 2, further comprising moving contents of the second level queue into the first level queue.

4. The method of claim 1, wherein the predetermined pattern is based on a feedback based on the first or second level queue.

5. The method of claim 1, wherein the predetermined variable stepping pattern is further based on at least one of:
    a staggered method; and
    a feedback based on the first or second queue.

6. The method of claim 1, wherein the method is performed by a computer unit, SIMD, or shader processor of the accelerated processing unit.

7. The method of claim 1, wherein the wavefronts represent iterative algorithms with variable amounts of work for the work-items.

8. The method of claim 1, wherein the wavefronts are representative of face or object recognition, video motion estimation, or ray tracing algorithms.

9. A system for optimizing wavefront processing in an accelerated processing device, the system comprising:
    a compute engine comprising a plurality of processors configured to process a plurality of work-items associated with a wavefront, wherein the plurality of processors execute in parallel;

a first level queue associated with each of the plurality of processors;

a second level queue associated with each of the plurality of processors; and a scheduling system configured to allocate the plurality of work-items to positions within the plurality of first and second level queues in a predetermined variable stepping pattern.

10. The system of claim 9, wherein the scheduling system is configured to cause the plurality of processors to process contents of the associated first level queue.

11. The system of claim 10, wherein the scheduling system is configured to move the contents of the second level queue into the first level queue.

12. The system of claim 9, wherein the predetermined pattern is based on a feedback based on the first or second level queue.

13. A computer program product comprising at least one non-transitory computer readable storage medium encoding instructions thereon that, in response to execution by a computing device, cause the computing device to perform operations comprising:

queuing one or more work-items of a wavefront into a first level queue of a compute unit; and when one or more additional work-items exist, queuing the additional work-items into a second level queue of the compute unit;

wherein the work-items and the additional work-items are queued into positions within the first and second level queues in a predetermined variable stepping pattern.

14. The computer program product of claim 13, further comprising:

moving the contents of the first queue into a plurality of processors in the compute unit for processing; and moving the contents of the second queue into the first queue.

15. A non-transitory computer readable media storing instructions wherein said instructions when executed optimize wavefront processing in an accelerated processing device, with a method comprising:

queuing one or more work-items of a wavefront into a first level queue of a compute unit; and when one or more additional work-items exist, queuing the additional work-items into a second level queue of the compute unit;

wherein the work-items and the additional work-items are queued into positions within the first and second level queues in a predetermined variable stepping pattern.

16. The non-transitory computer readable media of claim 15, wherein the instructions comprise instructions of Verilog or RTL hardware description language software.

* * * * *